Feb. 21, 1961 C. C. BEUTLER 2,972,585

PHOTOSENSITIVE SEMI-CONDUCTING MATERIAL
AND METHOD OF MAKING THE SAME
Filed Oct. 6, 1955

INVENTOR:-
CAROLEE C. BEUTLER
BY:-
Junius F. Cook, Jr.
ATTORNEY

United States Patent Office 2,972,585
Patented Feb. 21, 1961

2,972,585

PHOTOSENSITIVE SEMI-CONDUCTING MATERIAL AND METHOD OF MAKING THE SAME

Carolee C. Beutler, Waukesha, Wis., assignor to General Electric Company, a corporation of New York Filed Oct. 6, 1955, Ser. No. 538,861

7 Claims. (Cl. 252—501)

Figure 1:
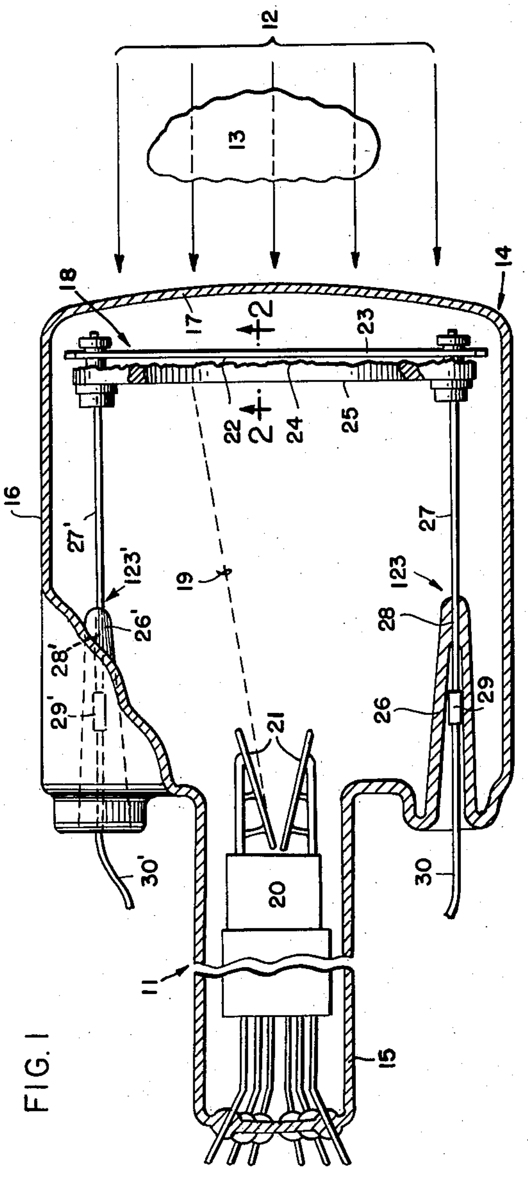

The present invention relates in general to electrical semi-conductors, and has more particular reference to an improved photosensitive semi-conductor material, particularly well adapted for use as an image transducing layer in an X-ray camera tube, the invention pertaining more especially to improved procedures for preparing the material and including the production of the improved material as a thin, image transducing layer upon and in electrical contact with a suitable support plate, ready for assembly as a part of an X-ray camera tube, or for other semi-conducting purposes.

A semi-conductor may be defined as a substance having electrical impedance which varies in accordance with the intensity of light, or other rays, to which the substance is sensitive, electrical impedance being that characteristic of materials which tends to prevent or impede the flow of electrical current therethrough under the influence of electrical potential. A semi-conductor, in the absence of rays to which it responds, may have impedance characteristics of such high order as to constitute the material as an insulator capable of preventing the flow of electrical current therethrough, the impedance of the material becoming reduced as a proportional function of the intensity of sensitizing rays applied thereto.

The ability of semi-conductors to thus alter the impedance characteristics thereof in response to incident ray intensity may be employed for many useful purposes by connecting the semi-conductor in electrical transmission systems designed to perform or to control the performance of desired operations in response to ray induced changes in the impedance of the so connected semi-conductor.

As disclosed more particularly in U.S. Letters Patent, No. 2,809,323, which issued October 8, 1957, on the invention of John E. Jacobs and Harold Berger, in Penetrating Ray Transducer, a semi-conductor material may be formed as a thin layer on and in electrical contact with a plate of electrical conducting material for the purpose of converting a ray carried image into the form of an electrical signal capable of being transmitted to, and applied upon, remotely located signal receiving equipment containing a picture reproducing device in which the transmitted signal may be converted to visible form. In such equipment, light rays, such as X-rays, carrying the image to be transduced, may be applied to the photosensitive layer of semi-conducting material to thereby alter the impedance characteristics of the layer forming material in accordance with the intensity of image carrying rays applied thereto. The image, accordingly, may be converted to an electrical signal by measuring the impedance variations induced in the layer by the impinging image carrying rays, and by producing electrical signal impulses corresponding with the intensity of ray excitation of the layer, as shown by impedance variations therein, the same corresponding with the latent picture image carried by the layer exciting rays.

An important object of the present invention is to produce an improved photosensitive semi-conductor material; a further object being to produce material of the character mentioned which is particularly well suited for disposition as a thin layer, as on and in electrical contact with a support plate or panel of electrical conducting material; a still further object being to provide an improved photosensitive semi-conducting material, adapted to be formed as a thin, image transducing layer, as in a photoelectric camera tube; a still further object being to provide an improved semi-conducting material that is highly sensitive to penetrating rays, such as X-rays.

Another important object is to provide a semi-conducting material of the character described, and comprising lead monoxide; a further object being to provide effective procedures for the production of lead monoxide as a photosensitive semi-conducting material; a still further object being to provide inexpensive yet effective procedures for activating lead monoxide, with a metal atomically dispersed therein, in order to constitute the same as an electrical semi-conducting material.

Another important object is to produce lead monoxide as an electrical semi-conducting material by adding an activating metal, such as copper, silver, manganese, or other suitable activator substance, in the form of a soluble salt of the substance, to a solution of lead acetate or nitrate, or other soluble lead salt, and by thereafter precipitating lead hydroxide, by adding ammonium, sodium, potassium, or other soluble hydroxide, thereafter washing and drying the precipitated lead hydroxide and converting it to lead monoxide, either by heating the hydroxide to a temperature of the order of 300° centigrade, preferably at a pressure of the order of one mm. Hg, or by boiling the lead hydroxide with potassium or sodium hydroxide, then washing and drying the resulting lead monoxide, and finally applying it as a thin layer of activated semi-conductor material, as on a support plate or panel.

Another important object resides in producing activated lead monoxide as an electrical semi-conducting material by forming a water slurry of pure inactivated lead monoxide with a salt of a suitable activating metal, such as copper, silver, manganese, and the like, the slurry being then evaporated to dryness and ground to a fine powder.

Another important object is to form the activated semi-conductor material as a thin layer on and in electrical contact with a support plate of suitable electrical conducting material, such as aluminum, by vacuum evaporation of the material, and condensation thereof as a layer upon the panel; a further object being to evaporate the material slowly, over a period of the order of 8–16 hours, at a temperature of the order of 750° centigrade; a further object being to apply the vaporized material to the support plate in low pressure atmosphere of oxygen.

Another important object is to apply lead monoxide as a thin layer of electrical semi-conducting material on and in electrical contact with a support panel or plate of electrical conducting material, such as aluminum, by settling the monoxide, in powdered form, onto the plate in a solution of potassium silicate as a binder.

Briefly stated, the present invention provides for the production of lead monoxide as an electrical semi-conductor material by incorporating therein atomic quantities of a suitable metal activating substance, such as copper, silver, manganese, and the like, either by mixing together, in aqueous solution, soluble salts of lead and of the activating metal, precipitating lead hydroxide from the mixture, and converting the hydroxide to activated lead monoxide, as by heating the hydroxide to a temperature of the order of 300° centigrade, or by boiling the hydroxide in sodium or potassium hydroxide, or by forming a slurry of pure lead monoxide with a salt of the activating metal, thereafter drying and pulverizing the slurry to produce the active semi-conductor in powdered form, the invention including the application of the semi-conductor as a thin layer on and in electrical contact with a support panel or plate of aluminum or other electrical conducting material, either by the slow evaporation and condensation of semi-conductor material on the upper panel, at low pressure, in an oxygen rich atmosphere, or by settling the semi-conductor in powdered form upon the support plate, in the presence of potassium silicate as a binder.

The foregoing and numerous other important objects, advantages and inherent functions of the invention will become apparent as the same is more fully understood from the following description, which, taken in connection with the accompanying drawings, discloses a preferred embodiment of the invention.

Figure 2:
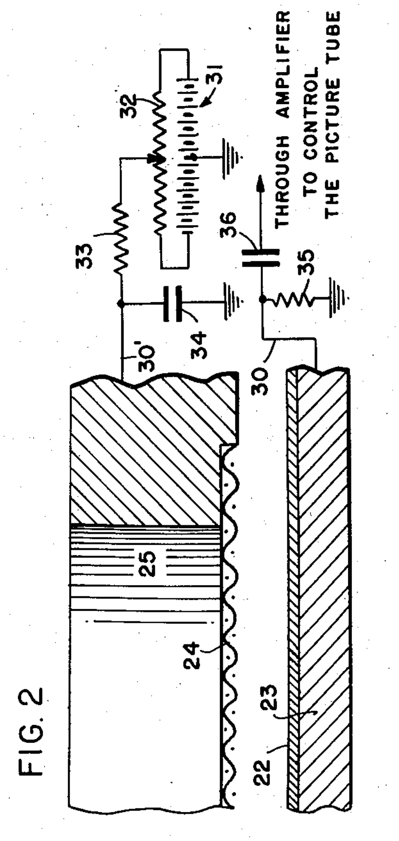

Referring to the drawings:

Fig. 1 is a sectional view through an electronic camera tube comprising an image transducer, embodying a layer of semi-conducting material produced in accordance with the teachings of the present invention and formed as a thin, image transducing layer upon a support plate; and Fig. 2 is a greatly enlarged, fragmentary sectional view, taken substantially along the line 2—2 in Fig. 1.

To illustrate the invention, the drawings show picture producing apparatus comprising an image transducer 11 adapted to receive penetrating rays 12, such as X-rays, emanating from a suitable ray source, and latently carrying the image of an object 13 disposed in the path of the rays 12 between the ray source and the transducer 11. The transducer 11 is generally of the sort which forms the subject matter of U.S. Letters Patent No. 2,809,323, aforesaid, the same being adapted to produce electrical signal impulses corresponding with the characteristics of the image of the object latently carried by the rays 12. Signal impulses produced by the transducer may be delivered to and applied for the operation of a remotely located, picture reproducing tube of the sort commonly employed for television picture reproducing purposes.

As shown, the transducer 11 may comprise a sealed and evacuated envelope 14, preferably formed of glass, and providing a tubular electron gun housing 15 at one end of the envelope, and an enlarged portion 16 forming a scanning chamber in open communication with the gun housing at one end thereof. The envelope 14 may include a preferably outwardly bowed end wall 17 sealing and enclosing the end of the scanning chamber remote from the gun housing. Latent image pickup means 18 may be provided within the end wall 17 in position disposed in the path of the image carrying rays 12, said pickup means being also disposed in alinement with the gun housing, in position to be scanned by an electron beam 19 emitted by an electron gun structure 20 mounted in the gun housing.

The gun structure 20 may be of any suitable, preferred or convenient form, and may be used in connection with conventional horizontal and vertical beam deflecting plates 21; or magnetic beam deflecting coils disposed outwardly of the gun housing may be used in conjunction with the gun for beam deflecting purposes, in accordance with well known electron scanning beam procedures. The image pickup means 18, as shown, comprises a relatively thin layer of photosensitive electrical semi-conducting material 22, said layer having substantially uniform thickness and being coated upon and in electrical contact with a suitable support panel or plate 23 of electrical conducting material.

In accordance with the present invention, the photosensitive material forming the layer 22 comprises lead monoxide as a semi-conducting material rendered sensitive to X-rays by means of a suitable metallic activator, such as copper, silver, manganese, and the like, activation being attained by the dispersion of minute atomic quantities of the activator substance in the lattice structure of the lead monoxide. Activated lead monoxide may be prepared, in accordance with the present invention, by adding the activator metal in the form of a soluble salt thereof to a solution of lead acetate, lead nitrate, or other soluble lead salt, in order to produce an adequate mixture from which lead hydroxide containing ions of the activating metal may be precipitated. Where copper is to be employed as the activating metal, the nitrate, chloride, acetate, or other soluble salt of copper, may be employed for the purpose of introducing the activating substance in the solution from which lead hydroxide is to be precipitated. Silver nitrate, acetate, or other soluble salt of silver, may be employed where it is desired to apply silver as the activating metal. Likewise, the chloride, nitrate, acetate, or other soluble salt of manganese, may be utilized where manganese is employed as the activating metal.

Lead hydroxide may be precipitated from the solution by adding ammonium, sodium, potassium, or any other soluble hydroxide. The lead hydroxide forms as a gel which adsorbs ions of the activator metal which become tightly trapped in the hydroxide. It is preferable to employ ammonium hydroxide as the precipitating medium, since sodium, potassium and other cations than the ammonium ion may be undesirably adsorbed by the precipitated lead hydroxide. After precipitation, lead hydroxide may be washed and dried and then converted to the monoxide form, as by heating the hydroxide to a temperature of the order of 300° centrigrade, preferably at reduced pressure of the order of 1 mm. Hg. Alternately, the hydroxide, after being washed and dried, may be reduced to the monoxide form by introducing the hydroxide into a boiling solution of potassium or sodium hydroxide. The resulting lead monoxide thus activated as a semi-conductor is then preferably washed and dried, after which it may be formed as a layer 22 on the panel or plate 23 in any suitable or preferred manner, as by evaporating the activated material, preferably in a low pressure chamber, and the condensation thereof as a thin film upon a surface of the panel.

Activated lead monoxide has been prepared in accordance with the foregoing procedure by first forming an aqueous solution consisting of 185 grams of lead acetate—$Pb(Ac)_2.3H_2O$—together with 4.3 grams of copper nitrate—$Cu(NO_3)_2.3H_2O$—dissolved in 1000 cubic centimeters of preferably distilled water, lead hydroxide being precipitated from such solution by the addition thereto of 500 cubic centimeters of concentrated (28%) ammonium hydroxide. The foregoing procedure will produce approximately 113 grams of lead hydroxide—$2PbO.H_2O$—which may be reduced to 108 grams of lead monoxide either by heating the same under low pressure conditions at a temperature of the order of 300° C., or by boiling the hydroxide in a solution of potassium or sodium hydroxide.

In the foregoing example, 161.5 grams of lead nitrate—$Pb(NO_3)_2$—or equivalent amount of other soluble lead salt, may be substituted for lead acetate. Furthermore 3.04 grams of copper chloride—$CuCl_2.2H_2O$—or 3.56 grams of copper acetate—$Cu(C_2H_3O_2)_2.H_2O$—or an equivalent amount of other soluble copper salt, may be employed in place of copper nitrate, for copper activation of the semi-conductor material.

Activation of the material with silver may be accomplished by substituting 1.78 grams of silver nitrate—$AgNO_3$—or 1.75 grams of silver acetate ($AgC_2H_3O_2$), or an equivalent amount of any other soluble silver salt, for the copper salt referred to supra.

Likewise, 20.4 grams of manganese chloride—

$$MnCl_2.4H_2O$$

or 29.5 grams of manganese nitrate—$Mn(NO_3)_2.6H_2O$—or 38.0 grams of manganese acetate—

$$Mn(C_2H_3O_2)_2.4H_2O$$

or an equivalent amount of other soluble manganese salt, may be substituted for the above mentioned copper salt, where it is desired to activate the semi-conductor with manganese.

In order to reduce the washed and dried lead hydroxide to lead monoxide, the same may be boiled in a 40% aqueous solution of potassium of sodium hydroxide, 2 cubic centimeters of the solution being provided for each treated gram of dried lead hydroxide. Some of the monoxide may become dissolved in the sodium or potassium hydroxide, but crystallizes out upon cooling of the solution. Boiling of the solution should be continued for an interval of the order of 30 minutes and then cooled, after which the resulting lead monoxide may be washed and dried.

Optimum weight percentages of the activator metal which may thus be incorporated, in the solution from which lead hydroxide is precipitated, by the foregoing procedures are 1.0% silver, 1.0% copper, and 5% manganese, such optimum weight percentages being the amounts of activating metal required in the original solution in order to produce lead oxide which, after evaporation and condensation as a layer 22, on the support panel 23, is more photoconductive than that which would be produced from solutions containing either greater or lesser amounts of the activating metal. Greater or lesser amounts of activating metal, of course, may be obtained in the resultant activated lead monoxide by increasing or decreasing the relative amount of activating metal salt in the original solution from which lead hydroxide is precipitated. The precise proportion of activating metal present in the layer 22 for optimum conductivity has not been ascertained, since some of the activating metal present in the original solution fails to be trapped in the lead hydroxide precipitate. Some of it is removed from the precipitate by washing the precipitate and the monoxide derived therefrom. Furthermore, when the activated lead oxide is evaporated and deposited as a film or layer 22, on the panel 23, the material of the resulting layer probably does not contain the same proportion of activating metal as is present in the material prior to evaporation, due to the difference in vapor pressures of lead monoxide and of the activator material.

The procedure described, supra, in connection with the production of activated lead monoxide, may be employed to produce pure unactivated lead monoxide merely by omitting or withholding the activating metal salt from the original solution. Pure lead monoxide may be activated by adding the activator metal in the form of a soluble salt to the pure dry monoxide. This may be accomplished by forming a slurry of the monoxide with a preferably aqueous solution of a metallic activating salt, such as the chloride, nitrate, acetate, or other soluble salt of copper, silver, manganese, or other activating metal. The slurry or mixture of the monoxide with the soluble activating metal salt solution should be thoroughly mixed, as by stirring, then evaporated to dryness and ground to powder. Insoluble compounds of the activator metal also may be ground up and mixed with pure lead monoxide to form an aqueous slurry in order to activate the same as a semi-conductor, but more intimate distribution of the activating metal in the monoxide is obtained where the same is applied in the slurry in the form of a soluble salt of the activating metal.

As a specific example, 2 cubic centimeters of copper nitrate—$CuNO_3.3H_2O$—containing 0.0005 $Cu^{++}$ per cubic centimeter, may be added to 10 grams of lead monoxide, together with preferably distilled water in sufficient quantity (approximately 2 cubic centimeters) to form a slurry. The mixture, after being well stirred and evaporated to dryness, may be ground, as in a mortar and pestle, to form approximately 10 grams of copper activated lead monoxide. Equivalent amounts of the chloride or acetate of copper, or of the nitrate or acetate of silver, or the nitrate, chloride or acetate of manganese, or other compounds of copper, silver, manganese, or other activating metal may be substituted for the copper nitrate cited in the foregoing specific example.

Optimum weight percentages of the activator metal which may thus be incorporated in the slurry supra are 0.05% silver, 0.05% copper, and 1.0% manganese, such optimum weight percentages being the amounts of activating metal required in the slurry in order to produce lead oxide which, after evaporation and condensation as a layer 22, on the support panel 23, is more photoconductive than that which would be produced from slurries containing either greater or lessere amounts of the activating metal. Greater or lesser amounts of activating metal, of course, may be obtained in the resultant activated lead monoxide by increasing or decreasing the relative amount of activating metal salt in the slurry prior to the drying and pulverization of the same. The precise proportion of activating metal present in the layer 22 for potimum conductivity has not been ascertained for reasons akin to those mentioned supra in connection with activated lead monoxide produced by precipitation from a solution of the salts of lead and of the activating metal.

To illustrate the stoichiometric ratios of the proportions listed in the foregoing examples, the following calculations may be made.

| Reagent: | Molecular weight |
|---|---|
| $Pb(C_2H_3O_2)_2 \cdot 3H_2O$ | 379.4 |
| $Pb(NO_3)_2$ | 331.2 |
| $Cu(NO_3)_2 \cdot 3H_2O$ | 241.6 |
| $CuCl_2 \cdot 2H_2O$ | 170.5 |
| $Cu(C_2H_3O_2)_2 \cdot H_2O$ | 199.7 |
| $AgNO_3$ | 169.9 |
| $AgC_2H_3O_2$ | 166.9 |
| $MnCl_2 \cdot 4H_2O$ | 197.9 |
| $Mn(NO_3)_2 \cdot 6H_2O$ | 287.0 |
| $Mn(C_2H_3O_2)_2 \cdot 4H_2O$ | 245.1 |

Amount of Pb ion used $$\frac{207.2 \text{ (mol. wt. of Pb)} \times 185}{379.4 \text{ (mol. wt. of } Pb(C_2H_3O_2)_2 \cdot 3H_2O\text{)}} = 101 \text{ grams}$$

$$\frac{207.2 \text{ (mol. wt. of Pb)} \times 161.5}{331.2 \text{ (mol. wt. of } Pb(NO_3)_2\text{)}} = 101 \text{ grams}$$

Amount of Cu used $$\frac{63.6 \text{ (mol. wt. of Cu)} \times 4.3}{241.6 \text{ (mol. wt. of } Cu(NO_3)_2 \cdot 3H_2O\text{)}} = 1.1 \text{ grams}$$

$$\frac{63.6 \text{ (mol. wt. of Cu)} \times 3.04}{170.5 \text{ (mol. wt. of } CuCl_2 \cdot 2H_2O\text{)}} = 1.1 \text{ grams}$$

$$\frac{63.6 \text{ (mol. wt. of Cu)} \times 3.56}{199.7 \text{ (mol. wt. of } Cu(C_2H_3O_2) \cdot H_2O\text{)}} = 1.1 \text{ grams}$$

Amount of Ag used $$\frac{107.9 \text{ (mol. wt. of Ag)} \times 1.78}{169.9 \text{ (mol. wt. of } AgNO_3\text{)}} = 1.1 \text{ grams}$$

$$\frac{107.9 \text{ (mol. wt. of Ag)} \times 1.75}{166.9 \text{ (mol. wt. of } AgC_2H_3O_2\text{)}} = 1.1 \text{ grams}$$

Amount of Mn used $$\frac{54.9 \text{ (mol. wt. of Mn)} \times 20.4}{197.9 \text{ (mol. wt. of } MnCl_2 \cdot 4H_2O\text{)}} = 5.7 \text{ grams}$$

$$\frac{54.9 \text{ (mol. wt. of Mn)} \times 29.5}{287.0 \text{ (mol. wt. of } Mn(NO_3)_2 \cdot 6H_2O\text{)}} = 5.7 \text{ grams}$$

Ratio of Pb to Cu, Ag and Mn based upon 95 parts of lead $$\frac{101}{95}=1.1 \text{ grams per part}$$

Ratio of reactants: 95 parts of Pb, 1 part Cu, 1 part Ag and 5.2 parts of Mn.

The support panel or plate 23 may comprise any suitable or convenient electrical conducting material. The material is preferably transparent to image carrying rays so that the layer 22 may be applied upon the back side of the panel, that is to say, the side of the panel which is remote from the side thereof to which image carrying rays are applied. Where the image to be transduced is carried by penetrating rays, such as X-rays, the panel 23 may conveniently be formed of preferably thin gauge aluminum, while material such as electrical conducting glass, or other optically transparent electrical conductor, may be employed where it is desired to transduce images carried by visible light rays.

The layer 22 of light sensitive semi-conducting material may be applied upon the panel 23 by disposing the same in a closed evaporation chamber containing a tray or boat of platinum filled with activated semi-conducting material preferably in powdered form. The plate may be supported immediately above the boat in position to receive the layer 22 upon the surface thereof which faces downwardly toward the boat. The evaporation chamber, if desired, may be evacuated and maintained under low vacuum pressure conditions, as by connecting the same with a suitable exhaust pump. Boat carried semi-conducting material may then be evaporated by heating the same, as by means of an induction heating coil, or other suitable heating means. The vaporized material thus produced in the closed chamber will be applied to and will condense upon the boat facing surface of the plate 23, thereby forming the layer 22 upon the panel.

It has been found, however, that lead monoxide layers having improved photoconductivity and response speed, can be obtained by providing for evaporation and condensation of the semi-conductor material in an atmosphere of oxygen, provided that the evaporation and condensation of the material is accomplished slowly, during a period of the order of 8–16 hours, at an evaporation rate between 0.2 to 0.003 gram per cm.$^2$ per hour, the temperature of the material containing boat being preferably maintained at about 750° C. In order to provide an atmosphere of oxygen in the closed chamber, the same may be evacuated to a pressure of $10^{-6}$ mm. Hg, and then filled with oxygen at a pressure of the order of from $7\times10^{-4}$ to $1.4\times10^{-3}$ mm. Hg.

After the layer 22 has thus been applied on a surface of the panel 18, it may be assembled upon suitable support means 123, 123′, within the envelope 14; and the envelope may be evacuated, gettered and sealed. Irradiation of the layer 22 by the image carrying rays 12 will correspondingly alter the impedance of the material of the layer, and thus apply in the layer 22 a latent image corresponding with the ray carried image to be transduced, said latent image being defined in the layer 22 in terms of the impedance characteristics of each integral portion of the irradiated layer. The transducer 11 thus provides means for successively and repetitively measuring the ray controlled impedance of each integral portion of the layer 22, to thereby produce transmissible signals corresponding with the impedance defined latent image induced in the layer 22. To these ends, the pick-up means 18, in addition to the layer 22 and its support panel 23, may comprise a foraminous layer 24 mounted in closely spaced relationship with respect to the panel 23, in position overlying the surface thereof which carries the layer 22.

The foraminous layer 24 may comprise a fine mesh, woven metal wire screen, of the order of 60 meshes per lineal inch, the panel 23 and wire screen 24 being electrically insulated, the one from the other, and being supported in spaced relation, such spacement being preferably of the order of one-eighth inch. The foraminous screen 24 may be tightly stretched and secured upon a suitable support frame 25, the marginal edges of the screen being electrically and mechanically secured to the frame, as by means of solder.

The support means 123, 123′, may comprise re-entrant envelope portions 26, 26′, carrying stems 27, 27′ of electrical conducting material forming glass-to-metal seals 28, 28′ with said re-entrant portions, the stems 27, 27′ having portions extending in the enlarged envelope portion 16 and terminating adjacent the end wall 17 of the envelope, and opposite end portions extending outwardly of the envelope through the re-entrant portions 26, 26′, said outwardly extending portions of the stems 27, 27′ being electrically connected, as at 29, 29′, with preferably flexible conductors 30, 30′. The screen carrying frame 25, as well as the panel 23, may be mounted upon the stems 27, 27′, in manner presenting the panel and screen immediately inwardly of the envelope end wall 17, in position centered with respect to the electron gun structure 20, the screen 24 being disposed in parallel spaced relation with respect to the layer 22, and between it and the electron gun structure. The panel 23 and the frame 25 may be mounted upon the stems 27, 27′ in fashion electrically connecting the panel with one of the stems, such as the stem 27, and the frame 25 with another stem, such as the stem 27′, both the panel and frame being mechanically supported on all of the stems.

When the transducer is in operation, a potential difference of desired value supplied from a suitable unidirectional power source 31 may be maintained between the panel 23 and the foraminous screen 24. To this end, the power source 31 may be medially connected to ground, the opposite ends of the source being connected across a resistor 32 forming a potentiometer having an associated adjustable tap connected, preferably, through a resistor 33 with the foraminous screen connected conductor 30′. By adjusting the potentiometer tap, any desired positive or negative voltage, with respect to ground, within the range of voltage supplied by the power source 31, may be applied to the mesh screen 24. If desired, the screen may be connected to ground through a condenser 34, and the plate or panel 23 may be connected to ground, as through the conductor 30 and an output resistor 35.

When the layer 22 is dark, that is to say, when it is not being irradiated by image carrying rays 12 to which it is responsive, the voltage drop across the layer 22, when the same is scanned by the electron beam 19, will be merely the relatively small current loss characteristic of the constituent material of the layer. When the layer is irradiated by rays to which it is sensitive, the voltage drop across the layer, at the spot of impingement of the scanning beam 19 thereon, will be directly proportional to the intensity of layer impinging rays. Such voltage drop, however, will be instantly restored from the power source 31, since the scanning beam 19 serves as a conduction path between the foraminous screen 24 and the facing surface of the layer 22. The extent of such restoration may be measured in terms of voltage developed across the output resistor 35; and such voltage will accurately define the latent image imposed upon layer 22 by the layer exciting rays 12. The voltage developed across the resistor 35 may be applied through a coupling condenser 36 as a signal applied as through any preferred translation system for controlling the operation of a remotely located picture reproducing viewing tube.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A photoconductive composition consisting essentially of lead monoxide having incorporated therein a small amount of an activator ion selected from the group consisting of copper, silver and manganese said photoconductive lead monoxide being formed by adding a sufficient quantity of ammonium hydroxide to an aqueous solution consisting essentially of a salt of divalent lead ion and a salt of an ion selected from the group consisting of divalent copper, silver, and divalent manganese, said ions being present in said solution in the ratio of 95 parts by weight of lead, one part by weight of copper, one part by weight of silver and five parts by weight of manganese, to precipitate lead hydroxide having incorporated therein said activator and heating said hydroxide at a pressure of about 1 mm. Hg at a temperature of about 300° C. to thermally decompose said lead hydroxide to lead monoxide.

2. A photoconductive composition consisting essentially of lead monoxide having incorporated therein a small amount of an activator selected from the group consisting of copper, silver, and manganese, said photoconductive lead monoxide being formed by adding a sufficient quantity of ammonium hydroxide to an aqueous solution consisting essentially of a salt of divalent lead ion and a salt of an ion selected from the group consisting of divalent copper, silver, and divalent manganese, said ions being present in said solution in the ratio of 95 parts by weight of lead, one part by weight of copper, one part by weight of silver and 5.2 parts by weight of manganese to precipitate lead hydroxide having incorporated therein said activator and boiling said lead hydroxide in a solution of a hydroxide selected from the group consisting of potassium and sodium hydroxies.

3. A method of preparing photoconductive lead monoxide which comprises the steps of adding to an aqueous solution containing 95 parts by weight of divalent lead ion and an activator ion selected from the group consisting of divalent copper, silver, and divalent manganese, said copper, silver, and manganese ions being present in a concentration of one, one and 5.2 parts by weight respectively, sufficient ammonium hydroxide to precipitate lead hydroxide having one of said activators incorporated therein and thereafter heating said precipitated hydroxide at a pressure of about 1 mm. Hg and at a temperature of 300° C. to decompose said lead hydroxide to lead monoxide.

4. A method of preparing photoconductive lead monoxide which comprises the steps of adding to an aqueous solution containing 95 parts by weight of divalent lead ion and an activator ion selected from the group consisting of divalent copper, silver, and divalent manganese, said copper, silver, and manganese ions being present in a concentration of one, one and 5.2 parts by weight respectively, sufficient ammonium hydroxide to precipitate lead hydroxide having one of said activators incorporated therein and thereafter boiling said precipitated hydroxide in an aqueous solution of an alkali hydroxide selected from the group consisting of sodium and potassium hydroxides.

5. A method as defined in claim 4 wherein copper is utilized as said activator ion, wherein said alkali hydroxide solution is a 40% solution and wherein two cubic centimeters of alkali hydroxide solution are utilized for each gram of lead monoxide.

6. A method as defined in claim 4 wherein silver is utilized as said activator ion, wherein said alkali hydroxide solution is a 40% soluiton and wherein two cubic centimeters of alkali hydroxide solution are utilized for each gram of lead monoxide.

7. A method as defined in claim 4 wherein manganese is utilized as said activator ion wherein said alkali hydroxide solution is a 40% solution and wherein two cubic centimeters of alkali hydroxide solution are utilized for each gram of lead monoxide.

References Cited in the file of this patent

UNITED STATES PATENTS

| | | |
|---|---|---|
| 1,997,479 | Burg | Apr. 9, 1935 |
| 2,074,676 | Treacy | Mar. 23, 1937 |
| 2,157,506 | Treacy | May 9, 1939 |
| 2,687,484 | Weimer | Aug. 24, 1954 |
| 2,730,638 | Cashman | Jan. 10, 1956 |
| 2,742,438 | Thomsen | Apr. 17, 1956 |

OTHER REFERENCES

Mellor: "A Comprehensive Treatise on Inorganic and Theoretical Chemistry," vol. VII, pp. 638–643, Longmans, Green and Co., 1927.

Moss, T.S.: "A Relationship between the Refractive Index and the Infra-Red Threshold of Sensitivity for Photoconductors," in The Proceedings of the Physical Society, sec. B, vol. 63, part 3, March 1950, pp. 167–173.

UNITED STATES PATENT OFFICE

CERTIFICATION OF CORRECTION

Patent No. 2,972,585 February 21, 1961

Carolee C. Beutler

It is hereby certified that error appears in the above numbered patent requiring correction and that the said Letters Patent should read as corrected below.

Column 9, line 37, for "hydroxies" read -- hydroxides --.

Signed and sealed this 22nd day of August 1961.

(SEAL)
Attest:

ERNEST W. SWIDER
Attesting Officer

DAVID L. LADD
Commissioner of Patents